(12) United States Patent
Weinberger et al.

(10) Patent No.: US 11,271,272 B2
(45) Date of Patent: Mar. 8, 2022

(54) BATTERY MODULE

(71) Applicant: SAMSUNG SDI CO., LTD., Yongin-si (KR)

(72) Inventors: Martin Weinberger, Maria Saal (AT); Martin Kraker, Graz (AT); Matic Blaznik, Tomsiceva ul (SL); Jörg Killmann, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 202 days.

(21) Appl. No.: 16/664,575

(22) Filed: Oct. 25, 2019

(65) Prior Publication Data
US 2020/0136118 A1 Apr. 30, 2020

(30) Foreign Application Priority Data

Oct. 26, 2018 (EP) .................................. 18202761
Oct. 23, 2019 (KR) ........................ 10-2019-0132567

(51) Int. Cl.
*H01M 50/502* (2021.01)
*H01M 50/308* (2021.01)

(52) U.S. Cl.
CPC ....... *H01M 50/502* (2021.01); *H01M 50/308* (2021.01)

(58) Field of Classification Search
CPC .. H01M 50/502; H01M 50/308; H01M 50/10; H01M 50/20
See application file for complete search history.

(56) References Cited

U.S. PATENT DOCUMENTS

| | | | |
|---|---|---|---|
| 9,705,121 | B2 | 7/2017 | Fuhr et al. |
| 9,991,645 | B2 | 6/2018 | Fritz et al. |
| 2011/0076521 | A1 | 3/2011 | Shimizu et al. |
| 2012/0094155 | A1 | 4/2012 | Lim |
| 2013/0273404 | A1 | 10/2013 | Ochi et al. |
| 2014/0008781 | A1 | 1/2014 | Nishi et al. |

(Continued)

FOREIGN PATENT DOCUMENTS

| | | |
|---|---|---|
| CN | 102456857 A | 5/2012 |
| CN | 104067408 A | 9/2014 |

(Continued)

OTHER PUBLICATIONS

Extended European Search Report issued in EP18202761.5, dated Mar. 19, 2019, 10 pages.

(Continued)

*Primary Examiner* — Kenneth J Douyette
(74) *Attorney, Agent, or Firm* — Lewis Roca Rothgerber Christie LLP

(57) ABSTRACT

A battery module includes: a plurality of battery cells aligned with each other in an alignment direction; a plurality of busbars; an inlay molded to at least one of the busbars and having a height equal to or less than the at least one busbar; and a top cover on the busbars. Each of the battery cells includes a battery case, an electrode assembly in the battery case, a cap assembly on the battery case, a gas exhaust vent in the cap assembly, and cell terminals protruding over the cap assembly. Each of the busbars electrically connects the cell terminals of a group of the battery cells to each other. The top cover covers the cap assemblies, the busbars, and the inlay, and the busbars and the inlay form a support surface facing towards the top cover to support the top cover.

15 Claims, 6 Drawing Sheets

(56) References Cited

U.S. PATENT DOCUMENTS

| | | |
|---|---|---|
| 2014/0305698 A1 | 10/2014 | Ishikawa et al. |
| 2014/0335393 A1 | 11/2014 | Wada et al. |
| 2015/0207126 A1 | 7/2015 | Chorian et al. |
| 2015/0372268 A1 | 12/2015 | Ichikawa et al. |
| 2016/0380252 A1 | 12/2016 | Rhein et al. |
| 2017/0012268 A1 | 1/2017 | Watanabe |
| 2017/0179458 A1 | 6/2017 | Sato et al. |
| 2018/0088179 A1 | 3/2018 | Ota et al. |

FOREIGN PATENT DOCUMENTS

| | | |
|---|---|---|
| CN | 104795528 A | 7/2015 |
| CN | 105103333 A | 11/2015 |
| CN | 105940523 A | 9/2016 |
| CN | 107810566 A | 3/2018 |
| CN | 107871839 A | 4/2018 |
| EP | 2 989 676 B1 | 3/2017 |
| JP | 2010-205509 A | 9/2010 |
| JP | 2012-164477 A | 8/2012 |

OTHER PUBLICATIONS

European Office action issued in corresponding EP Application No. 18202761.5, dated Mar. 18, 2021, 5 pages.

Chinese Office action issued in corresponding application No. CN 201911024238.7, dated Dec. 22, 2022, (with English Translation) 17 pages.

(A)

(B)

(C)

BATTERY MODULE

CROSS-REFERENCE TO RELATED APPLICATIONS

This application claims priority to and the benefit of European Patent Application No. 18202761.5, filed in the European Patent Office on Oct. 26, 2018, and Korean Patent Application No. 10-2019-0132567, filed in the Korean Intellectual Property Office on Oct. 23, 2019, the entire content of both which are incorporated herein by reference.

BACKGROUND

1. Field

Aspects of embodiment of the present invention relate to a battery module.

2. Related Art

A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric or hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, such as a cylindrical or rectangular shape, depends on the battery's intended purpose.

Rechargeable batteries may be used as a battery module formed of (or including) a plurality of unit battery cells coupled to each other in series and/or in parallel to provide a high energy density for, as an example, driving a motor of a hybrid vehicle. For example, the battery module may be formed by interconnecting the electrode terminals of the plurality of unit battery cells, with the number of unit battery cells being determined depending on a desired amount of power, to provide a high-power rechargeable battery for, as an example, an electric vehicle.

Battery modules may have either a block design or a modular design. In the block design, each battery cell is coupled to a common current collector structure and a common battery management system. In the modular design, pluralities of battery cells are connected to each other to form submodules, and several submodules are connected to each other to form the battery module. Battery management functions may be realized on either the module or submodule level and, thus, interchangeability of the components is improved. One or more battery modules are mechanically and electrically integrated, equipped with a thermal management system, and configured to communicate with one or more electric consumers to form a battery system.

To provide electrical integration of a battery system having the modular design, either submodules including a plurality of cells that are connected to each other in parallel are connected in series (XpYs) or submodules including a plurality of cells that are connected to each other in series are connected in parallel (XsYp). XpYs-type submodules can generate relatively high voltages, and in XsYp-type submodules, the capacitance of the cells is added and, thus, XsYp-type submodules are generally used with relatively low capacitance cells.

A battery module usually includes a casing enclosing all of (or substantially all of) its constituting components. To provide thermal control of the enclosed components, a thermal management system may be used to efficiently emit, discharge, and/or dissipate heat generated within the casing. When a thermal management system is omitted or the heat drain (or heat removal) from the casing is i insufficient, the internal temperature may increase, which can lead to abnormal reactions occurring within the battery cells. An example of such an abnormal operation condition is thermal runaway of a battery cell, which may be caused by strongly overheated or overcharged Lithium ion cell. Thermal runaway is a self-accelerating chemical reaction inside the battery cell that produces large amounts of heat and gas, until all available material is exhausted. Due to large amount of hydrogen and carbon monoxide within the produced gas, the produced gas may be toxic and flammable.

A battery cell generally includes a venting opening, which allows the gas produced in an abnormal operation condition to be released from the cell when a certain overpressure and/or a certain temperature (e.g., a reference pressure and/or a reference temperature) inside the cell is exceeded. However, battery modules generally enclose the components therein in an essentially gas tight manner, which might lead to damage to when the internal pressure is greatly increased. Further, dangerous fumes and gases that may occur (or may be generated) during thermal runaway or due to other dysfunctions of the battery cells may accumulate within the casing and/or may be released in uncontrolled manner. The combination of these effects poses a serious threat for users of the battery system, which may be exposed to the toxic gases and/or may be harmed by the explosion of a module case due to overpressure.

The battery module case is usually sealed and gas-tight] to protect the constituent components from environmental impacts, such as mechanical impacts, dust, and humidity. The top side of a battery module at where the interconnected cell terminals, the busbar structure, and/or control electronics, such as a Cell Supervision Circuit (CSC) and/or a Battery System Manager (BSM) are particularly prone to damage due to mechanical impacts. Hence, mechanical protection of the top side (or top section) of a battery module is important.

However, the venting openings in prismatic battery cells are usually disposed on top of the prismatic battery cells, for example, between the cell terminals of a battery cell. Hence, discharge of the venting gases by the plurality of battery cells must also occur in an upper region of the battery module. Thus, the mechanical components of the battery module are in conflict with the desire to ensure safe gas-discharge from the battery module.

SUMMARY

According to embodiments of the present invention, at least some of the drawbacks of the related art may be overcome or at least mitigated and a battery module having improved mechanical properties, particularly with respect to an upper region of the battery module, and having improved properties regarding the gas discharge from a top section of the battery module may be provided.

According to one embodiment, a battery module includes a plurality of battery cells aligned in an alignment direction, which is the extension or lengthwise direction of the battery module. Each of the battery cells of the battery module includes an electrode assembly accommodated in a battery case, such as a prismatic battery case with a rectangular cross section. The battery cells each further include a cap assembly placed on (e.g., sealing) the battery case, and a gas exhaust vent is in the cap assembly. The gas exhaust vent is configured to emit gas if a reference (e.g., predetermined) pressure threshold in the battery case is exceeded, for example, during an abnormal operation condition of the battery cell. Cell terminals protrude over the cap assembly. In some embodiments, the cell terminals protrude (e.g., extend) through the cap assembly. In another embodiment, one cell terminal may protrude over (or through) the cap assembly, while the battery case is the other terminal. In one embodiment, each battery cell includes a first cell terminal and a second cell terminal, and the gas exhaust vent is disposed between the first and the second cell terminals.

The battery module, according to embodiments of the present invention, further include a plurality of busbars disposed on top of the cap assemblies (e.g., arranged over) the cap assemblies. For example, the busbars are disposed above the battery cells in a height direction of the battery module (e.g., over the cap assemblies thereof). One or more layers may be disposed between the busbars and the battery cells to, for example, electrically isolate the cases from the busbars, or the busbars may be disposed directly on the battery cell cases. Each of the busbars is configured to electrically connect the cell terminals of a plurality of the battery cells, with the number of battery cells depending on the number of battery cells connected to each other in parallel in the battery module. That is, in a battery module having an $X_pY_s$ configuration, each busbar is configured to electrically connect the cell terminals of 2*X battery cells, i.e., to parallely connect the battery cells to each other. Together, the plurality of busbars are configured to conduct a current of (or through) the battery module, that is, to transport the summed current of all of the battery cells connected to each other in parallel in the battery module. That is, the busbars are configured differently than wires or conductors, which merely conduct probe voltages or currents for measurements.

According to embodiments of the present invention, one or more inlays are formed in the layer of the busbars. In some embodiments, the inlays do not exceed the height of the busbars. For example, the inlays may not protrude over (or above) the busbars in the height direction of the battery module or under the busbars in the direction opposite to the height direction (e.g., a negative height direction) of the battery module. For example, the inlays may have, at most, the height of (e.g., may have a height that is equal to or less than that of) the busbar. Further, the inlays may not merely encapsulate the busbars but are rather molded (e.g., positively molded) to at least one busbar. In other words, each inlay is form fitted to the exterior shape of at least one busbar. In some embodiments, the inlays are molded (e.g., injection molded) from a thermoplastic or thermosetting material to the exterior shape of the busbar within the stratum (or layer) of the busbar (e.g., the inlay may be molded to lateral side walls of the busbar). In some embodiments, one inlay is positively molded to two busbars, filling a gap between the busbars in the stratum (or layer) of the busbars. Further, at least one inlay may be positively molded to only one busbar to, for example, fill a gap between the busbar and an outer boundary of the battery module.

The battery module, according to embodiments of the present invention, further includes a top cover that is disposed on top of the busbars and is configured to cover the cap assemblies of each of the battery cells, the plurality of busbars, and the at least one inlay. In other words, the top cover extends over the entire battery module in the lengthwise direction thereof and in a direction opposite to the lengthwise direction thereof (e.g., a width direction thereof). Further, the top cover may be configured to seal a top section of the battery module, for example, to fully confine a volume above the battery module together with the cap assemblies of the battery module. The confined volume may have a gas exhaust path as described in more detail below. According to embodiments of the present invention, the plurality of busbars and the inlay form a support surface faces towards the top cover and is configured to mechanically support the top cover. Hence, if a mechanical load is applied to the battery module from the top thereof, the combination of the busbars and the inlay(s) provides sufficient support for the top cover and damage to the top cover may be avoided or at least mitigated. For example, a situation in which the top cover is pushed into void spaces between the busbars in the layer of the busbars, which might lead to damage to the top cover, may be avoided. Thus, by providing the inlay(s), edges and/or corners of the battery module may be smoothed and the mechanical stability of the battery module against mechanical loads applied from the top thereof may be improved.

In one embodiment, the plurality of busbars and the inlay(s) form a straight and/or level support surface. By providing a straight surface, the top cover, which contacting the combination of busbars and inlays, contacts the entire surface at the same time and not only at protrusions thereof. Thus, any mechanical load applied to the top of the battery module is distributed across the entire surface area thereof. Further, by providing a level surface, a level battery module with a level top cover can be provided. A straight and/or level surface may be provided by the inlay(s) being positively molded to one or more busbars in the layer of the busbar (e.g., in the busbar layer) and having a height that corresponds to (e.g., is the same or substantially the same as) the height of the corresponding busbar (e.g., is equal to the height of the busbar).

In one embodiment, the battery module includes a plurality of inlays, and each of the inlays is positively molded to at least one busbar as described above. Some of the inlays are positively molded to two busbars and others of the inlays are positively molded to only one busbar. According to such an embodiment, the plurality of inlays and the plurality of busbars form a continuous support surface that extends along the battery cells (e.g., along all of the battery cells) in the alignment direction of thereof. For example, the plurality of inlays and the plurality of busbars form a continuous support surface that extends along the lengthwise direction of the battery module from one end of the battery module to the opposite end of the battery module. No trenches or elevations are present along the support surface in the lengthwise direction of the battery module. Further, such continuous support surface may also extend along the battery cells in a direction perpendicular to the alignment direction thereof (e.g., along a width direction of the battery module). Thus, the plurality of inlays and the plurality of busbars of the battery module may form a continuous support surface that essentially or substantially extends over the entire top section of the battery module (e.g., fully covers the battery cells of the battery module). According to such an embodiment, the combination of busbars and inlays fills the entire volume between the battery cells and the top cover of the battery module. Hence, a mechanically stable battery module is provided.

According to some embodiments, the gas exhaust vent of each battery cell is between a first cell terminal and a second cell terminal of that battery cell. The first cell terminal of each battery cell may be disposed near a first terminal end of the cap assembly of that battery cell, and the second cell terminal may be disposed near a second terminal end of the cap assembly that is opposite to the first terminal end. The first cell terminals of the battery cells may be aligned in the lengthwise direction of the battery module, and the second cell terminals of the battery cells may be aligned in the lengthwise direction of the battery module. According to this embodiment, a first subset of busbars electrically interconnects the first cell terminals, and a second subset of busbars electrically interconnects the second cell terminals. For example, the first subset of busbars extends along the first terminal ends of the cap assemblies, and the second subset of busbars extends along the second terminal ends of the cap assemblies. The gas exhaust vents of the battery cells are disposed between the plurality of first busbars (e.g., the first subset of busbars) and the plurality of second busbars (e.g., the second subset of busbars). The gas exhaust vents may also be aligned in the lengthwise direction of the battery module. According to this embodiment, a first subset of inlays is positively molded to the busbars of the first subset of busbars and a second subset of inlays is positively molded to the busbars of the second subset of busbars. Therein, the first set of inlays and the second set of inlays is distinct from each other, that is, the inlays of these sets are not merely parts of a common inlay but are separate physical entities (e.g., are separate components). Further, the first set of inlays forms a first support surface, and the second set of inlays forms a second support surface as described above. Each of the first and second support surfaces extends along the battery module in the alignment direction of the battery module.

According to the above-described embodiment, a gas exhaust channel is formed in the layer of busbars, and the gas exhaust channel extends along the gas exhaust vents. For example, because inlays of the first set of inlays are distinct from the inlays of the second set of inlays, a void space is present between the first and second sets of inlays. That is, neither the first nor the second support surface extends along (e.g., entirely along or over the gas vents of) the battery module in a direction opposite to the alignment direction of the battery module. Rather, the gas exhaust channel is formed between the first support surface and the second support surface. Although the gas exhaust channel may reduce the support capability of the support surface, it provides a gas exhaust path for venting gases emitted via the gas exhaust vents of the battery cells. Further, the dimensions of the gas exhaust path may be suitably determined. For example, gas exhaust channel is confined by the first subset of inlays, i.e., the lateral side surfaces thereof facing the gas exhaust channel, the second subset of inlays, i.e., the lateral side surfaces thereof facing the gas exhaust channel, the cap assemblies of the battery cells, i.e., the portions of the top surfaces thereof surrounding (e.g., surrounding a periphery of) the respective gas exhaust vent, and the top cover of the battery module, i.e. the part thereof extending over the gas exhaust channel.

The gas exhaust channel may extend along the battery module in the alignment direction of the battery module and, in some embodiments, extends in the alignment direction of the battery module. For example, the gas exhaust channel provides a gas discharge path that terminates at one or more short lateral sides of the battery module. Hence, the vent gases of the plurality of battery cells can be safely discharged via the gas exhaust channel from the short sides of the battery module. Further, the gas exhaust channel may be closed at one short lateral side of the battery module by, for example, being further confined by a third busbar as described in more detail below. In this case, the vent gases are discharged from one short lateral side of the battery module and, thus, the discharge is even more controlled.

According to another embodiment, the battery module may include a first sublayer of busbars that is configured to interconnect a first subset of battery cells and a second sublayer of busbars that is configured to interconnect a second subset of battery cells. In an XpYs configuration, the first sublayer of busbars interconnects $Xp(0.5*Y)s$ battery cells and the second sublayer of busbars interconnects $Xp(0.5*Y)s$ battery cells. Further, in a XsYp configuration, the first sublayer of busbars interconnects $(0.5*X)sYp$ battery cells and the second sublayer of busbars interconnects $(0.5*X)sYp$ battery cells. Hence, in this embodiment, a denser packaging of the battery module is achievable, particularly if using partially overlaid busbars. To avoid short circuits between the sublayers, the first sublayer of busbars may be separated from the second sublayer of busbars via at least one electrically insulating layer.

Further, the second sublayer of busbars may be disposed over the first sublayer of busbars, and the busbars of the first sublayer may be shifted (or offset) with respect to the busbars of the second sublayer in, for example, the alignment direction of the battery module. Each busbar in the first sublayer of busbars (or of the first sublayer of busbars) may be shifted with respect to a corresponding busbar in the second sublayer of busbars (or of the second sublayer of busbars) in the lengthwise direction of the battery module. In other words, the busbars of the sublayers are partially overlaid with each other. Each busbar in the first sublayer of busbars is electrically isolated from each of the busbars in the second sublayer of busbars by distance and/or by an insulating layer between the busbars, such as between the partially overlaid busbars. By shifting the busbars, the gas exhaust channel is confined along wider stretches of the battery module by the lateral side surfaces of the busbars than when only a single layer of busbars is present.

In one embodiment, the first sublayer of busbars is separated from the second sublayer of busbars in a height direction of the battery module. For example, the battery module may include a first sublayer of busbars interconnecting a first subset of the battery cells, and the first sublayer of busbars is followed in the height direction of the battery module by at least one insulating layer (e.g., at least one insulating layer is disposed above the first sublayer of busbars). The insulating layer is followed in the height direction of the battery module by the second sublayer of busbars interconnecting a second subset of the battery cells (e.g., the second sublayer of busbars is disposed above the insulating layer). Additional (or further) insulating layers may be disposed below the first sublayer of busbars for isolating the battery cell cases and/or above the second sublayer of busbars isolating the top cover of the battery module.

According to another embodiment, at least one of the electrically insulating layers is formed of or includes a flexible printed circuit (FPC) layer embedded by outer insulating layers. For example, a FPC with electrically passive main surfaces may be used as an insulating layer. The main surfaces of the FPC may not be completely passive but may allow the FPC to be electrically connected to the busbars and/or the cell terminals of the battery cells of the battery module. In some embodiments, the FPC may be part of a Cell Supervision Circuit (CSC) connected to at least one busbar or cell terminal of the battery module for receiving at least one cell voltage and/or temperature of the at least one battery cell of the battery module. The FPC or any other insulating layer may have openings that are aligned with the gas exhaust vents of the battery cells to vent gases into the gas exhaust channel. The FPC may be disposed between the sublayers of busbars, below the first sublayer of busbars, or above the second sublayer of busbars.

According to another embodiment, the battery cells of the first subset and the battery cells of the second subset are interleaved with each other. Because the busbars in the first sublayer of busbars are shifted with respect to the busbars in the second sublayer of busbars as described above, a busbar in the first sublayer spans over at least one battery cell of the second subset without contacting it, and a busbar in the second sublayer spans over at least one battery cell of the first subset without contacting it. For example, the central body section (as further described below) of a busbar in the first sublayer may be located over the cell terminals of at least one battery cell of the second subset without contacting it, and the central body section of a busbar (as further described below) in the second sublayer may be located over the cell terminals of at least one battery cell of the first subset without contacting it. Herein, contact refers to electric contact but does not preclude mechanical contact.

In another embodiment of the battery module, each busbar of the plurality of busbars includes a busbar body portion that extends in the alignment direction of the battery module and further includes a plurality of legs that extend from the busbar body portion in a direction non-parallel to the alignment direction. The bus bar body portion has a length in the alignment direction sufficient for connecting cell terminals of a plurality of battery cells of the battery module. In some embodiments, the length of the busbar body portion corresponds to at least two times, but in some embodiments at least three times, the extension (e.g., the width) of a battery cell of the battery module in the lengthwise direction of the battery module. However, the length of the busbar body portion may also correspond to six times (2pXs), nine times (3pXs), or twelve times (4pXs) the extension of a battery cell of the battery module in the lengthwise direction of the battery module. The latter is well-suited for double-layer busbar configurations. The busbar body portion of the busbar may be planar and/or entirely planar.

The legs (e.g., the cell contact legs) are configured to electrically connect the busbar body portion and the cell terminals of the battery cells that are electrically connected to the busbar. Each leg may enclose an angle between about 0° and about 180°, such as between about 45° and about 135° with respect to the alignment direction of the battery module. Each leg may extend from the busbar body portion in a direction (essentially or substantially) perpendicular to the lengthwise direction of the battery module. Further, the legs may be essentially parallel to each other. In this embodiment, the busbar includes a number of legs equal to or less the number of battery cells interconnected by the busbar, and each leg connects at least one cell terminal to the busbar body portion. For example, when the busbar is configured to electrically connect two battery cells to each other, a first cell contact leg may extend perpendicularly from the busbar body portion, for example, from a first end thereof, to connect a cell terminal of a first cell, and a second cell contact leg may extend perpendicularly from the busbar body portion, for example, from a second end thereof, to connect a cell terminal of a second cell. However, each of these legs may be connected to a plurality of cell terminals, respectively, or each cell terminal may be connected to the busbar body via a separate leg.

According to the above-described embodiment, the busbar body portion, for example, the portion of the busbar that is primarily responsible for carrying an electric current, may be at least partially disposed next to the cell terminals by, for example, extending the cell contact legs from a busbar body portion in a direction non-parallel to a busbar extension direction. Because the cell terminals protrude upwardly from the battery cell case, there is space next to the battery cell terminals that is normally unused when the busbars are mounted on top of the battery cell terminals. Thus, the busbar body portion of the busbar according to embodiments of the present invention may be disposed within this space next to the battery cell terminals by, for example, contacting the cell terminals from the side thereof via respective legs or by using bent legs to contact the cell terminals from above while positioning the busbar body portion adjacent thereto. Then, the busbars body section is used to confine the gas exhaust channel and/or to form a support surface as described in more detail below.

Further, because the cell contacting legs extend from the busbar body portion in a direction non-parallel to the extension direction thereof, the busbar provides improved plasticity (e.g., flexibility or deformability). For example, the cell contacting legs can pivot to a certain extent around a connection portion to the busbar body portion. Any deformation of the busbar, particularly of the cell contact legs relatively to the busbar body portion, may be either elastic or plastic deformation. Hence, the flexibility of the busbar is increased compared to conventional bar-shaped busbars. Thus, the busbar according to embodiments of the present invention compensates for dimensional changes of the battery module due to, for example, cell swelling, and compensates for relative movement between the battery cells of the battery module. By damping mechanical loads due to the bending of the cell contact legs around their connection portion to the bus bar body portion, the probability of the busbar cracking or the like is decreased, and thus, stability of the battery module is increased. For example, the busbar according to embodiments of the present invention can be deformed in response to any displacement of the cell terminals to which it is connected without reaching its maximum strain (or breaking point). Further, the busbar reduces the maximum load acting on the cell terminal.

The busbar body portion includes a first body section (e.g., a first peripheral body section) and a second body section (e.g., a second peripheral body section), and the first body section and the second body section are spaced from each other in the extension direction of the busbar body portion (e.g., in the lengthwise direction of the battery module). Therein, the first and second body sections are spaced from each other by a third body section (e.g., a third central body section) of the busbar body portion. For example, the third body section is disposed between the first body section and the second body section. Thus, the busbar according to this embodiment is divided into three parts.

Further, at least one cell contact leg of the cell contact legs extends from the first peripheral body section, and at least one other cell contact leg of the cell contact legs extends from the second peripheral body section. For example, at least one cell contact leg extends from each of the first and second body section, respectively. In some embodiments, a first plurality of cell contact legs extends from the first body section, and a second plurality of cell contact legs extends from the second body section. In some embodiments, the first plurality of legs may equal the second plurality of legs. Further, the first body section and the second body section may have the same or substantially the same length in lengthwise direction of the battery module, and the first, second, and third body sections are may have the same or substantially the same length in the lengthwise (alignment) direction of the battery module.

Further, the length of the first body section corresponds to the spatial extension of the respective cell terminals connected to the first body section via respective cell contact legs. Therein, said length and said spatial extension refer to the extension direction of the busbar body portion (e.g., the lengthwise direction of the battery module). When two cell terminals are connected to the first body section of a busbar via one or two cell contact legs, the length of the first body section may correspond to the spatial extension of the two battery cell terminals, for example, of the two battery cell(s) (e.g., battery cell cases). Two cell terminals may also be connected to the second body section of the busbar via one or two cell contact legs, and the length of the second body section may correspond to the spatial extension of the two battery cell terminals, for example, to the spatial extension of the two battery cell(s) (e.g., the battery cell cases). The length of the third body section may correspond to the spatial extension of the two battery cell terminals, for example, of the two battery cell(s) (e.g., battery cell cases), in the lengthwise direction of the battery module. When the length of the third body section is equal to the length of the first and second body sections, a double layer busbar configuration as explained below is facilitated.

A plurality of cell contact legs extend from the first peripheral body section and at least two cell contact legs extend from the second peripheral body section. Hence, at least two cell terminals are connected to each of these body sections. Within each body section, the cell contact legs are separated (spaced apart) from each other in the extension direction of the busbar body portion, i.e., the lengthwise direction of the battery module, respectively. Particularly, the at least two cell contact legs extending from the first peripheral body section are spaced apart from each other and the at least two cell contact legs extending from the second peripheral body section are spaced apart from each other. Naturally, also the cell contact legs of the first and second body section are spaced apart. By separating the cell contact legs, i.e., by contacting each cell terminal with a single cell contact leg, the plasticity of the busbar is further increased, providing the advantages defined above.

The cell contact legs that extend from the first peripheral body section may be separated from each other by at least one first cutout. Further, the cell contact legs that extend from the second peripheral body section may be separated from each other by at least one second cutout. For example, within a peripheral body section, a cutout is disposed between each two adjacent cell contact legs. The material in the region of such cutout may be removed after casting a monolithic busbar blank. The cutouts (e.g., the first and second cutouts) may extend into the respective peripheral body section. Each cutout may be oriented parallel to the cell contact legs between the cell contact legs and may change direction within the respective peripheral body section.

In some embodiments, an end of the cutouts is not disposed between cell contact legs but may extend in an extension direction of the busbar body portion. With such cutouts, the plasticity of the busbar is further increased. By extending the cutouts into the peripheral body sections with, for example, a change in the extension direction of the cutout within these body sections, the mechanical properties of the busbar may be selectively adapted. Further, additional cutouts may be arranged within the cell contact legs, for example, one or more cutouts may be provided within each of the legs and/or within the third central body section.

The height of the busbar according to embodiments of the present invention, such as the height of the busbar body portion thereof, may be substantially smaller than the width and the length of the busbar. The length of the busbar may refer to (e.g., may correspond to or may be measured in) an extension direction of the busbar, and the width may refer to (e.g., may correspond to or may be measured in) a direction perpendicular to the extension direction. The height may then refer to (e.g., may correspond to or may be measured in) a direction perpendicular to the length direction and the width direction of the busbar. The height of the busbar, such as the height of the busbar body portion, may be smaller than the height of the cell terminals to which the busbar (e.g., the peripheral busbar body sections) is connected via respective cell contact legs. In the context of this disclosure, the height of the cell terminals refers to the extension of the cell terminals above a cap plate of a battery cell case, for example, along the battery module's height direction. Accordingly, a compact battery module may be provided.

According to one embodiment of the present invention, at least one of the body sections of the busbar as described above may extend in the lengthwise direction of the battery module with a spatial extension (e.g., a length) that corresponds to the spatial extension (e.g., a width) of at least one battery cell in the lengthwise direction of the battery module. In other words, at least one of the body sections of the busbar has a length in the lengthwise direction of the battery module that is at least the width of one battery cell (e.g., one battery cell casing) in the lengthwise direction of the battery module. For example, each body section of the busbar may have a spatial extension in the lengthwise direction of the battery module that corresponds to the spatial extension of at least one battery cell in the lengthwise direction of the battery module. Therein, as described in detail below, an extension of each body section that corresponds to the extension of one battery cell allows for a 1pYs configuration. For example, an extension of each body section of the busbar may correspond to the extension of "X" battery cells, and such a busbar allows for an "X"pYs configuration of the battery module.

For each busbar in the first sublayer of busbars, a busbar in the second sublayer of busbars exists that is shifted in the lengthwise direction of the battery module by the length of one body section of the busbars. The length referring to an extension of the busbar body section in the lengthwise direction of the battery module. Because the body sections of the busbar each have the same length in said direction, the busbars in the first and second sublayer of busbars are shifted along said direction by the length of any of these sections. In other words, the first or second peripheral body section of a busbar in the first sublayer of busbars may be overlaid with a third central body section of a busbar in the second sublayer of busbars. For example, the busbars in the first sublayer of busbars partially overlap the busbars in the second sublayer of busbars.

Further, when the extensions of the busbar's body sections correspond to the extension of a single battery cell, one battery cell of the first and second subset may follow each other in alternating fashion. When the extensions of the body sections of the busbars correspond to the extension of two battery cells, pairs of battery cells of the first and second subset may follow each other in alternating fashion. When the extensions of the busbar's body sections correspond to the extension of a plurality of battery cells, corresponding pluralities of battery cells of the first and second subset may follow each other in alternating fashion. Thus, the length of at least one (and, in some embodiments, each) of the body sections of the busbars corresponds to the spatial extension of battery cells connected in parallel within the battery module.

Further, any battery cell of the battery module may be connected to a busbar in the first sublayer of busbars and to a busbar in the second sublayer of busbars to provide an electrical connection between the first and second sublayers of busbars. Hence, an electrical connection between a first module terminal and a second module terminal can be closed via the first sublayer of busbars, the second sublayer of busbars, and the battery cells of the battery module. A battery module may include further (or additional) busbar elements (e.g., third busbar elements), which are configured to provide an electrical connection between the first and second sublayers of busbars and/or the first and second subsets of battery cells and/or to provide an electrical connection between battery module terminals and the battery cells. Further, other distributions of the battery cells within the first and second subsets of battery cells, for example, in which the interleaved pluralities include different numbers of battery cells, are possible.

According to one embodiment of the battery module, a busbar in the first sublayer of busbars has a busbar body portion that is configured to be placed next to a cell terminal and has, at most, the height of a cell terminal (e.g., the busbar body portion has a height that is equal to or less than the height of the cell terminal). The busbar in the first sublayer of busbars may include at least one leg with a cell terminal contact portion that is spaced apart from the busbar body portion in a height direction thereof (e.g., in a height direction of the battery module). In some embodiments, each of the cell contact legs of the busbar in the first sublayer of busbars has a cell terminal contact portion. Further, the busbar in the first sublayer of busbars has a bridging portion that connects the busbar body portion and the (respective) cell terminal contact portion. In some embodiments, an individual bridging portion is provided for each cell terminal contact portion. This embodiment allows the busbar in the first sublayer to contact the cell terminals from above the cell terminals while positioning the busbars in the first sublayer next to the cell terminals.

In some embodiments, a busbar in the second sublayer of busbars has a planar shape with, at most, the height of a cell terminal. For example, the planar shape of a busbar in the second sublayer of busbars corresponds to the height of the cell terminals and the height of a busbar in the first sublayer of busbars. Hence, when the busbar in the second sublayer of busbars is disposed on the busbars in the first sublayer of busbars and next to the cell terminals, the cell contact legs of the busbar in the second sublayer can extend over the cell terminals without being bent. However, other shapes of the busbars in the second sublayer of busbars are considered. In this embodiment, the gas exhaust channel is confined by lateral side surfaces of the busbars of both of the sublayers (e.g., both of the sublayers of busbars).

Further, the height of a busbar in the first sublayer of busbars and of a busbar in the second sublayer of busbars is equal to half the height of the cell terminals, respectively. Then, the height of a busbar in the second sublayer of busbars stacked upon a busbar in the first sublayer of busbars is aligned with the height of the cell terminals of the battery module. According to this embodiment, the busbars in the second sublayer of busbars also have cell contact legs with a cell terminal contact portion spaced apart from the busbar body portion in a height direct therefor for contacting the cell terminals and also have a bridging portion connecting the respective cell terminal contact portions and the busbar body portion as described above. However, the present invention is not limited to the above described embodiments, and further aspects and features of the present invention may be learned from the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
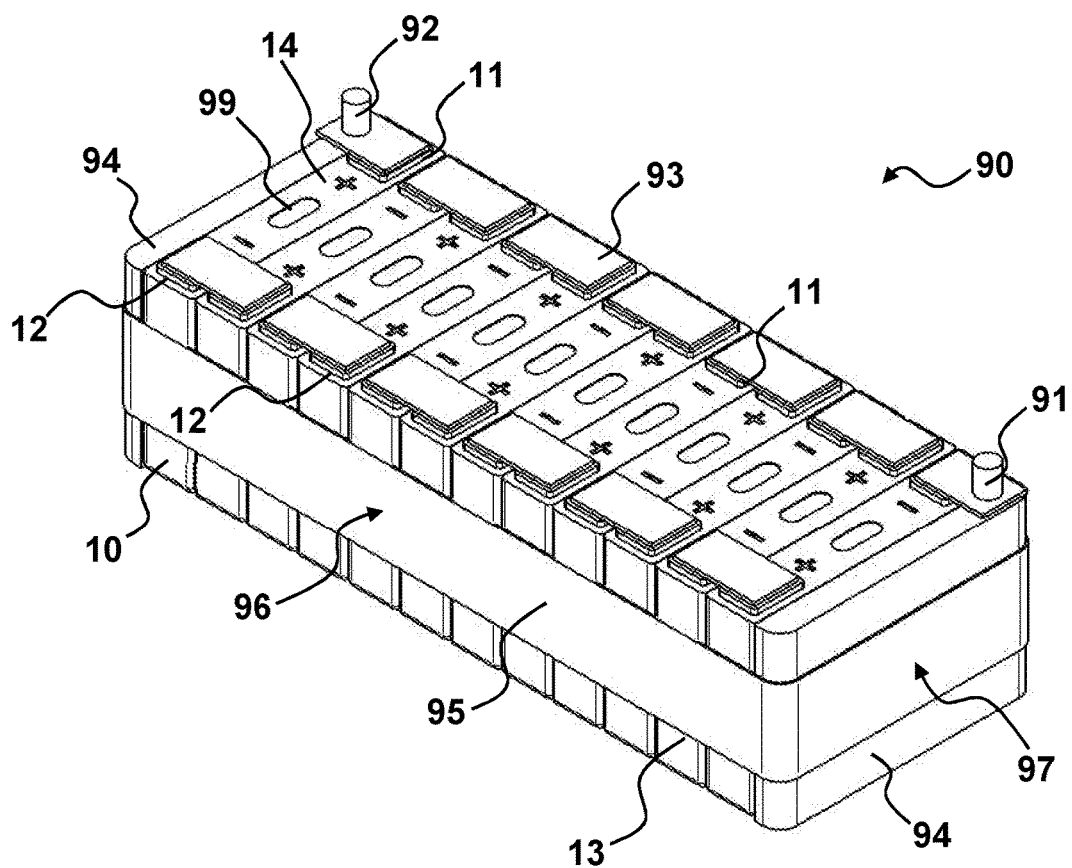
FIG. 1 is a schematic perspective view of a battery module.

Reference will now be made, in detail, to embodiments of the present invention, examples of which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. Also in the drawings, the relative sizes of elements, layers, and regions may be exaggerated for clarity.

The present invention, however, may be embodied in various different forms and should not be construed as being limited to the illustrated embodiments. Rather, these embodiments are provided as examples so that this disclosure will be thorough and complete and will fully convey the aspects and features of the present invention to those skilled in the art. Accordingly, processes, elements, and techniques that are not considered necessary for those having ordinary skill in the art to have a complete understanding of the aspects and features of the present invention may not be described.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are used to distinguish one element from another element. For example, a first element may be named a second element and, similarly, a second element may be named a first element, without departing from the scope of the present invention. Expressions, such as "at least one of," when preceding a list of elements, modify the entire list of elements and do not modify the individual elements of the list.

As used herein, the terms "substantially," "about," and similar terms are used as terms of approximation and not as terms of degree and are intended to account for the inherent deviations in measured or calculated values that would be recognized by those of ordinary skill in the art. Further, if the term "substantially" is used in combination with a feature that could be expressed by using a numeric value, the term "substantially" denotes a range of +/−5% of the value centered on the value.

FIG. 1 illustrates a battery module 90 including twelve prismatic battery cells 10 that are connected to each other in series between a first module terminal 91 and a second module terminal 92. Thus, the battery module 90 has a 12s1p configuration. Each battery cell 10 includes a battery case 13 with a cap assembly 14 on the battery case 13 (e.g., sealing an opening in the battery case 13), and a gas exhaust vent 99 is disposed in the cap assembly 14. Within the battery module 90, the battery cells 10 are stacked (or aligned) in a lengthwise direction with their wide, side surfaces facing each other such that first lateral walls of adjacent battery cells 10 face each other. As a result, the battery module 90 has a rectangular shape with a wide module side surface 96 extending in the lengthwise direction and a narrow module side surface 97 extending perpendicular thereto. First cell terminals 11 and second cell terminals 12 of neighboring battery cells 10 are electrically connected to each other through a bus bar 93. Spacers 94 are positioned adjacent to the outward facing (e.g., the outermost) wide, side surface of the outermost battery cells 10 and, hence, terminate the battery module 90 in the lengthwise direction. A ribbon 95 runs around the battery module 90 and compresses it in the lengthwise direction.

Figure 2:
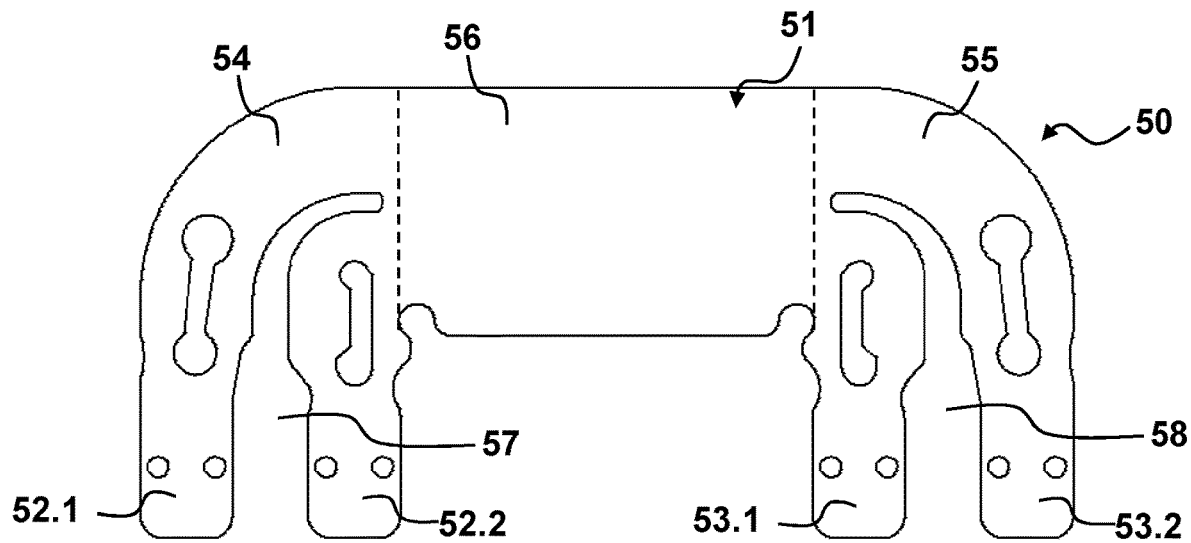
FIG. 2 is a schematic top view of a busbar according to an embodiment.

FIG. 2 is a schematic top view of a busbar 50 according to an embodiment. The busbar 50 may be used in a battery module 100 according to an embodiment of the invention (see, e.g., FIG. 3). The busbar (e.g., the planar busbar) 50 includes a busbar body portion 51 including of a first peripheral body section 54 and a second peripheral body section 55 that are separated by a central body section 56 interposed between the first and second body sections 54, 55. The central body section 56 has a rectangular shape, and the upper corners of the peripheral body sections 54, 55 are rounded. The peripheral body sections 54, 55 are further processed as described in more detail below. The busbar body portion 51 extends in an extension direction of the busbar 50 (i.e., the busbar 50 has its largest extension in the extension direction), which is the horizontal direction in FIG. 2.

A plurality of (e.g., a pair of) cell contact legs 52.1, 52.2 extends from the first peripheral body section 54 and a plurality of (e.g., a pair of) two cell contact legs 53.1, 53.2 extends from the second peripheral body section 55. Each of these cell contact legs 52, 53 extends in a direction that is perpendicular to the extension direction of the busbar body portion 51 (e.g., in downward vertical direction in FIG. 2). Each of these cell contact legs 52, 53 is configured to be connected to a cell terminal 11, 12 (see, e.g., FIG. 1). Thus, the busbar body portion 51 may be positioned next to the cell terminals 11, 12 in a space-saving manner.

The cell contact legs 52.1, 52.2 extending from the first body section 54 are separated from each other by a first cutout 57. For example, the cutout 57 forms a void space between the legs 52.1, 52.2 and extends therebetween in a direction perpendicular to the extension direction of the busbar body portion 51. The cutout 57 further extends into the first peripheral body section 54 of the busbar body portion 51. As the cutout 57 extends into the first peripheral body section 54, it changes its direction such that a terminal portion of the cutout 57 within first body section 54 extends parallel to the extension direction of the busbar body portion 51. Because the cutout 57 extends into the first body section 54, the cell contact legs 52 are prolonged almost to the central body section 56 (naturally with a change of direction).

The cell contact legs 53.1, 53.2 extending from the second body section 55 are separated from each other by a second cutout 58 that forms a void space between the legs 53.1, 53.2 and further extends therebetween in a direction perpendicular to the extension direction of the busbar body portion 51. The cutout 58 further extends into the second peripheral body section 55 of the busbar body portion 51 and changes its direction in doing so. A terminal portion of the cutout 58 within the second body section 55 extends antiparallel to the extension direction of the busbar body portion 51. Because the cutout 58 extends into the second body section 55, the cell contact legs 53 are prolonged almost to the central body section 56 (naturally with a change of direction).

The cutouts 57, 58 increase the plasticity (e.g., the flexibility) of the busbar 50, particularly of the cell contact legs 52, 53 and particularly within the extension direction of the busbar body portion 51. The plasticity of busbar 50 is further increased by providing bores at where the second and third cell contact leg 52.2, 53.1 and the central body section 56 of the busbar body portion 51 meet, respectively. Further cutouts in the cell contact legs 52.1, 52.2 also improve the plasticity of the busbar 50.

Figure 3:
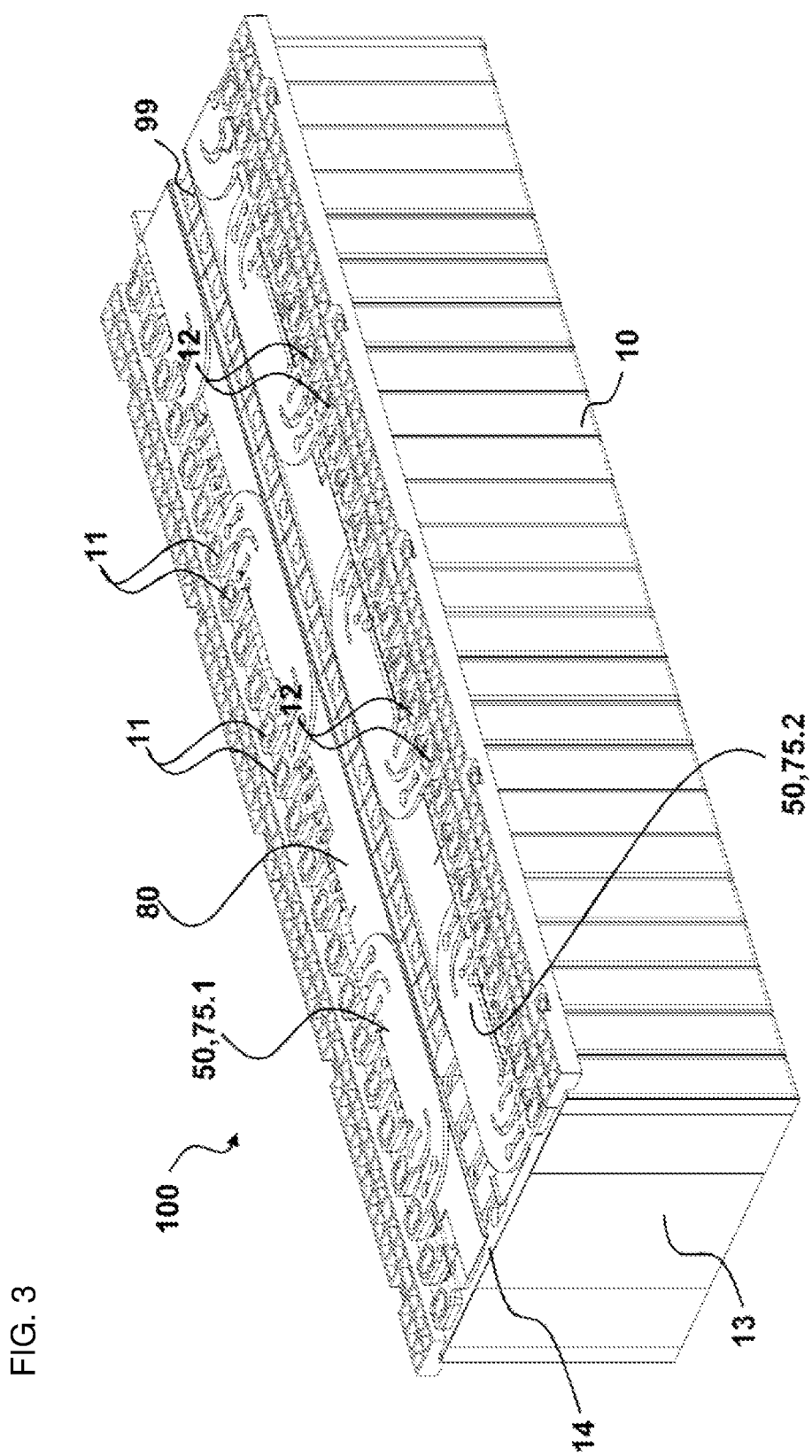
FIG. 3 is a schematic perspective view of a battery module according to an embodiment.
Figure 4:
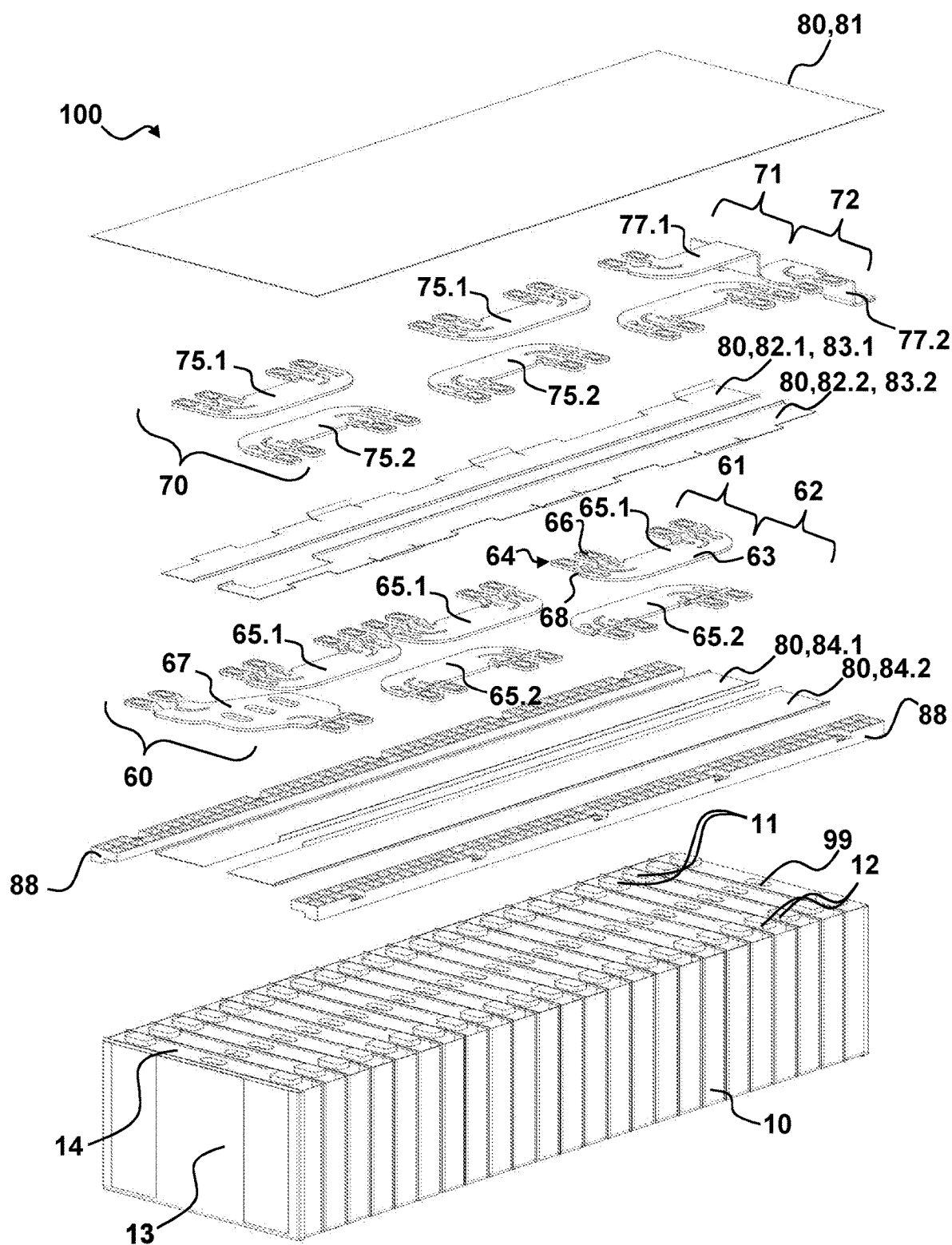
FIG. 4 is a schematic exploded perspective view of a battery module according to an embodiment.
Figure 5:
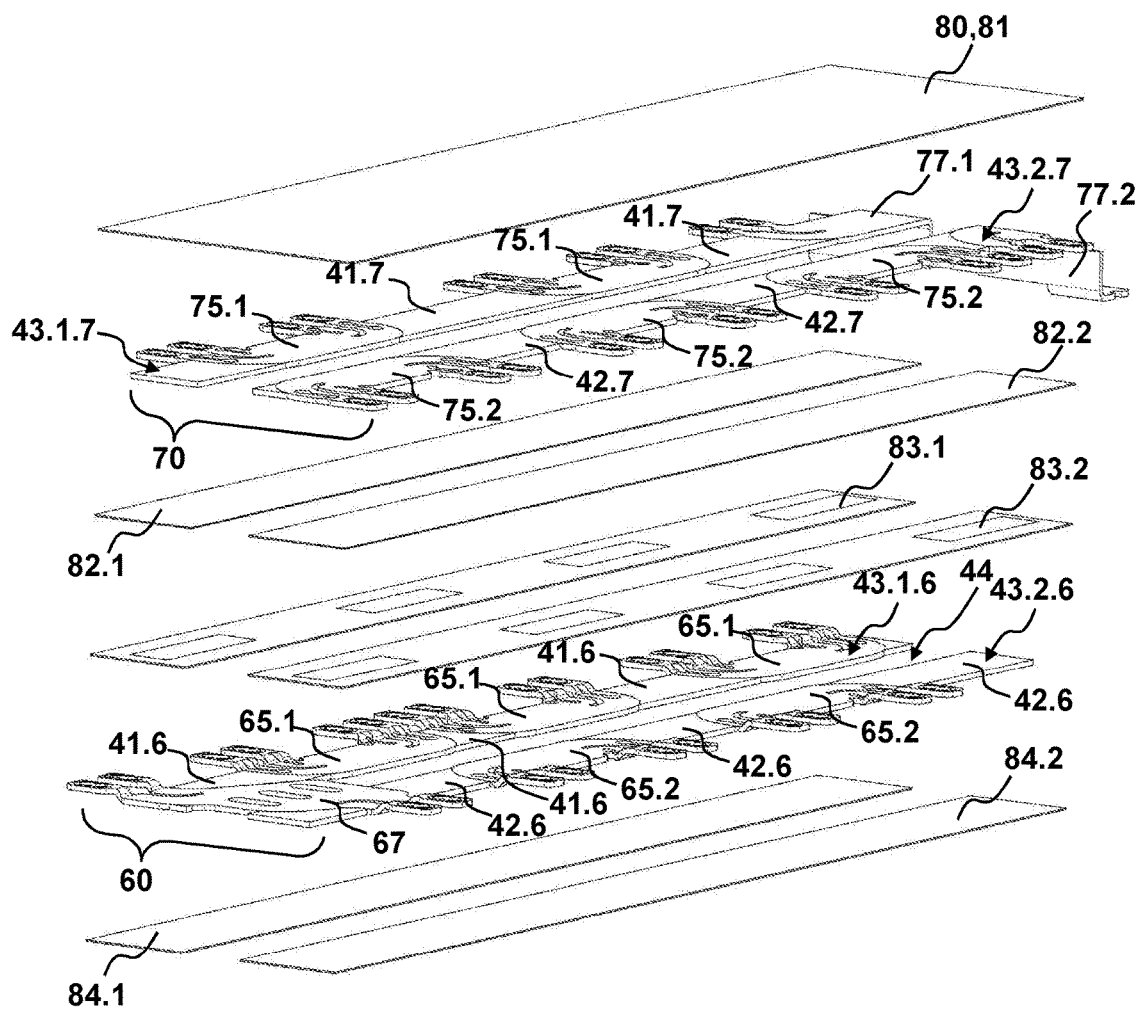
FIG. 5 is a schematic exploded perspective view of busbar layers of a battery module according to an embodiment.
Figure 7:
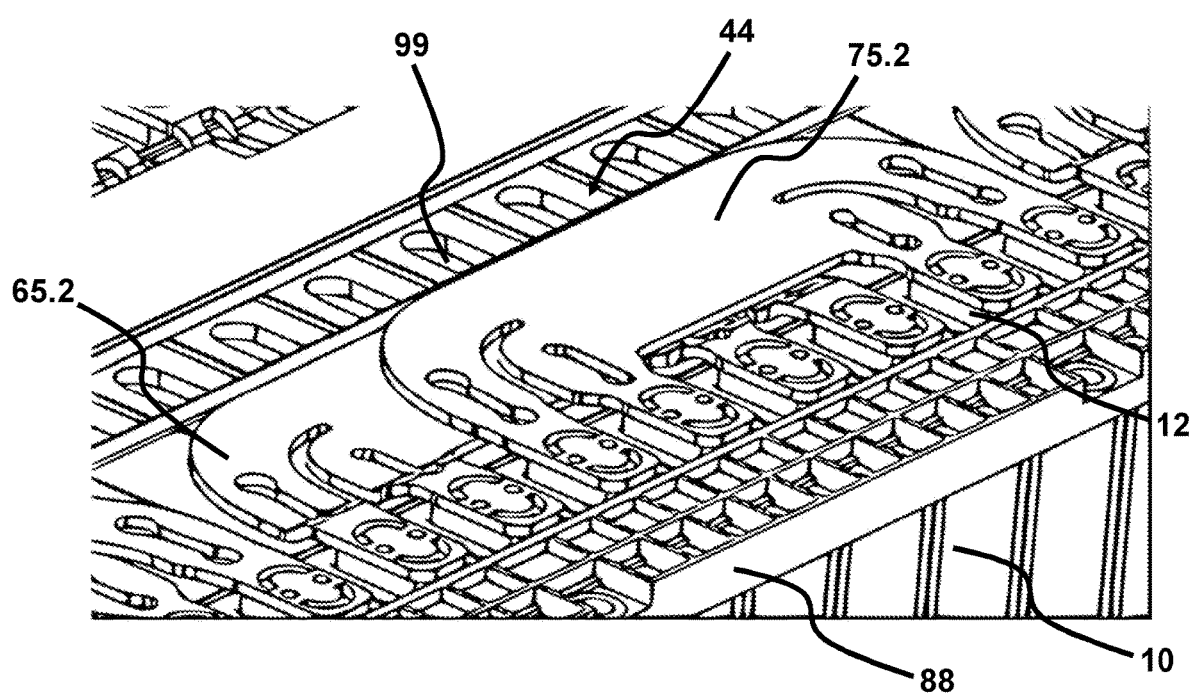
FIG. 7 is a schematic perspective view of a portion of a battery module according to an embodiment.

FIGS. 3-5 illustrate a battery module 100 according to an embodiment. FIG. 3 is a schematic perspective view of the battery module 100, FIG. 4 is an exploded view thereof, and FIG. 5 is an exploded view of a top region thereof. Further, FIG. 7 illustrates a detailed view of the battery module 100.

The battery module 100 shown in FIGS. 3-5 and 7 includes a plurality of battery cells 10 that are stacked (e.g., aligned) in a lengthwise direction of the battery module 100. Each of the battery cells 10 includes a battery case 13 for receiving (or accommodating) an electrode assembly and that is covered by a cap assembly 14. A gas exhaust vent 99 that allows vent gases to be discharged during an abnormal operation condition of the battery cell 10 is disposed in the cap assembly 14. Each battery cell 10 further includes a first cell terminal 11 and a second cell terminal 12 separated from each other by the gas exhaust vent 99 of that battery cell 10.

In the battery module 100, the first cell terminals 11 are aligned along one side of the battery module 100, and the second cell terminals 12 are aligned along another side of the battery module 100. A plurality of busbars 50, such as illustrated in, for example, FIG. 2, are utilized to interconnect the cell terminals 11, 12 of the battery cells 10 in order to form a 2p14s configuration of the battery module 100. Therein, a first subset of busbars 61, 71 connects the first cell terminals 11 of the battery cells 10, and a second subset of busbars 62, 72 connects the second cell terminals 12 of the battery cells 10. An embodiment of the detailed current routing (e.g., the current path among the battery cells 10) is illustrated in more detail in FIG. 7. FIG. 3 primarily shows the busbars 75.1, 75.2 of an upper second sublayer 75 of busbars connecting first and second cell terminals 11, 12 to each other, respectively.

As shown in the exploded view of FIG. 4, the edges of the plurality of aligned battery cells 10 are covered by edge protectors 88 that increase the mechanical stability of the battery module 100. Further, an insulating layer 84.1 is disposed between the first cell terminals 11 and the gas exhaust vents 99 of the battery cells 10, and another insulating layer 84.2 is disposed between the second cell terminals 12 and the gas exhaust vents 99 of the battery cells 10. The insulating layers 84.1, 84.2 may be arranged within one stratum/layer. These insulating layers 84.1, 84.2 provide electric insulation between the cap assemblies 14 of the battery cells 10 and the busbars 65 of a first sublayers 60 of busbars, which is disposed above the insulating layers 84.1, 84.2.

The first sublayer 60 of busbars 65 is divided into busbars 65.1 of a first subset 61 of busbars in the first sublayer 65 of busbars and busbars 65.2 of a second subset 62 of busbars in the first sublayer 65 of busbars. In other words, within the first sublayer 60 of busbars, the busbars 65.1 of a first subset 61 connect first cell terminals 11 to each other, and the busbars 65.2 of a second subset 62 connect second cell terminals 12 to each other. The first sublayer 60 further includes a third busbar 67, which is described in more detail below. A busbar 65 of the first sublayer of busbars 60 includes a planar busbar body portion 63 having, at most, the height of the cell terminals 11, 12 and a cell contact leg 64 with a cell terminal contact portion 66 that is spaced apart from the busbar body portion 63 in a height direction thereof and with a bridging portion 68 that connects the busbar body portion 63 and the cell terminal contact portion 66.

Above the busbars 65, 67 of the first sublayer 60, further insulating layers 82, 83 are disposed to electrically insulate the busbars 65, 67 of the first sublayer 60 from a second sublayer 70 of busbars disposed above the first sublayer 60 of busbars. In some embodiments, a two-layered insulating layer 82.1, 83.1 is disposed between the first subset 61 of busbars 65.1 of the first sublayer 60 of busbars and the first subset 71 of busbars 75.1 of the second sublayer 70 of busbars, and another two-layered insulating layer 82.2, 83.2 is disposed between the second subset 62 of busbars 65.2 of the first sublayer 60 of busbars and the second subset 72 of busbars 75.2 of the second sublayer 70 of busbars. A more detailed view of the insulating layers 82.1, 83.1, 82.2, 83.2 is shown in FIG. 5.

The insulating layers 82.1, 83.1, 82.2, 83.2 as well as the insulating layers 84.1, 84.2 are disposed in (e.g., only in) the area of the busbar body portions 51 of busbars 65, 75, while the cell contact legs 52, 53 of busbars 65, 75 as described above with respect to FIG. 2 are kept free from (e.g., extend beyond) any insulating layer 82, 83, 84. Hence, an electrical connection can be realized between the cell terminals 11, 12 and the busbars 65.1, 65.2, 75.1, 75.2 of the first and second sublayers of busbars 60, 70, respectively while the busbars 65, 75 from the first and second sublayers 60, 70 of busbars are electrically isolated from each other by the insulating layers 82, 83 and from the battery cases 13 by the insulating layer 84.

The second sublayer 70 of busbars includes a third busbar 77.1 that electrically connects the two outermost battery cells 10 to a first module terminal and a third busbar 77.2 that electrically connects two adjacent battery cells 10 to a second module terminal. A busbar 75 of the second sublayer of busbars 70 has a planar shape with, at most, the height of the cell terminals 11, 12. To electrically insulate the busbars 75, 77 of the second sublayer 70 of busbars from the environment, an insulating top cover 81 is disposed on the busbars 75, 77 of the second sublayer 70 of busbars. Therein, the top cover 81 covers the projected top surfaces of battery cells 10, the busbars of the first and second sublayer 60, 70, and the other two insulating layers 82, 84.

Detailed views of a top section of the battery module 100 shown in FIGS. 3 and 4 are shown in FIGS. 5 and 7. Therein, the top section of the battery module 100 includes (or refers to) the insulating layers 82, 83, 84, the busbars 65, 67 of the first sublayer 60 of busbars, the busbars 75, 77 of the second sublayer 70 of busbars, and the top cover 81. Therein, insulating layer 84 forms the lowermost layer of the top section and partially covers the cap assemblies 14 of the battery cells 10 as shown in FIG. 4. In some embodiments, the insulating layer 84 includes layers 84.1, 84.2, which are disposed between the gas exhaust vent 99 and the first cell terminal 11 and the second cell terminals 12, respectively. The busbars 65.1 of the first subset 61 of the first sublayer 60 and the busbars 65.2 of the second subset 62 of the first sublayer 60 are disposed on top of these insulating layers 84.1, 84.2, respectively. Therein, first sublayer 60 includes busbars 65 and the third busbar 67 and further includes inlays 41, 42 disposed within the first sublayer 60.

The inlays 41, 42 do not extend over the busbars 65, 67 in a height direction of the busbars 65, 67 of the first sublayer 60 and instead form a layer with (e.g., are in a same layer as) the busbars 65, 67. Further, each of these inlays 41, 42 is positively molded to at least one busbar 65, 67 (e.g., is form-fitting to an exterior shape of at least one busbar 65, 67). For example, inlays 41.6 are positively molded to the busbars 65.1 of the first subset 61 of the first sublayer 60. In some embodiments, three inlays 41.6 are positively molded to two busbars 65.1, 67 and one inlay 41.6 is positively molded to only one busbar 65.1. Further, inlays 42.6 are positively molded to the busbars 65.2 of the second subset 62 of the first sublayer 60. In some embodiments, two inlays 42.6 are positively molded to two busbars 65.2, 67 and two inlays 42.6 are positively molded to only one busbar 65.2, 67. The inlays 41 and the busbars 65.1 of the first subset 61 of the first sublayer 60 of busbars form a first continuous support surface 43.1.6, and the inlays 42 and the busbars 65.2 of the second subset 62 of the first sublayer 60 of busbars form a second continuous support surface 43.2.6. The first and second continuous support surfaces 43.1.6, 43.2.6 are connected to each other by inlays 41.6, 42.6, which are positively molded to the third busbar 67, respectively. The continuous support surfaces 43.1.6, 43.2.6 are, in some embodiments, of overall equal height and form a common straight and level support surface. In some embodiments, the inlays 41.6, 42.6 are injection molded to the busbars 65, 67 to fill the gaps between them and to mechanically consolidate the first sublayer 60 of busbars.

Above the layer including the first sublayer 60 of busbars and the inlays 41.6, 42.6, two further insulating layers 82, 83 are disposed that have similar extensions (e.g., similar length and width dimensions) as the insulating layer 84. For example, the insulating layer 82 includes a first partial layer 82.1 extending in a region between the first cell terminals 11 and the gas exhaust vents 99 and a second partial layer 82.2 extending in a region between the second cell terminals 12 and the gas exhaust vents 99. Further, the insulating layer 83 includes a first partial layer 83.1 extending in the region between the first cell terminals 11 and the gas exhaust vents 99 and a second partial layer 83.2 extending between the second cell terminals 12 and the gas exhaust vents 99.

Above these further insulating layers 82, 83, a second sublayer 70 of busbars is disposed that is electrically insulated from the first sublayer 60 of busbars 65, 67 by the insulating layers 82, 83. For example, the first subset 71 of busbars 75.1 of the second sublayer 70 and the second subset 72 of busbars 75.2 of the second sublayer 70 are disposed on top of the insulating layers 82.1, 83.1 and on top of the insulating layers 82.2, 83.2, respectively. Further, the second sublayer 70 includes busbars 75 and a third busbar 77 as described above and further includes inlays 41, 42 disposed within this sublayer 70 of busbars.

The inlays 41, 42 do not extend over the busbars 75, 77 in a height direction of the busbars 75, 77 to form a layer with these busbars 75, 77. Further, each of these inlays 41, 42 is positively molded to at least one busbar 75, 77 (e.g., is form-fitting to an exterior shape of at least one busbar 75, 77). The inlays 41.7 are positively molded to the first subset 71 of busbars 75.1 of the second sublayer 70. In some embodiments, two inlays 41.7 are positively molded to two busbars 75.1, 77.1 and one inlay 41.7 is positively molded to only one busbar 75.1. The inlays 42.7 are positively molded to the second subset 72 of busbars 75.2 of the second sublayer 70. In some embodiments, three inlays 42.7 are positively molded to two busbars 75.2, 77.2. and one inlay 42.7 is positively molded to only one busbar 75.2. The inlays 42 and the busbars 75.1 of the first subset 71 of busbars 75.1 of the second sublayer 70 form a first continuous support surface 43.1.7, and the inlays 42 and the busbars 75.2 of the second subset 72 of the second sublayer 70 of busbars form a second continuous support surface 43.2.7. The first and second continuous support surfaces 43.1.7, 43.2.7 are not connected to each other. The continuous support surfaces 43.1.7, 43.2.7 are, in some embodiments, of overall equal height and form individual straight and level support surfaces. In some embodiments, the inlays 41.7, 42.7 are injection molded to the busbars 75, 77 to fill gaps therebetween and to consolidate the first sublayer 60 of busbars as a mechanically stable layer.

Above this layer, which includes the second sublayer 70 of busbars 75, 77 and inlays 41, 42 forming continuous support surfaces 43.1.7, 43.7.7, an insulating top cover 81 is disposed, which fully covers the projected surfaces of the cap assemblies 14 of the battery cells 10. Hence, in the battery module 100 as shown in FIGS. 3-5 and 7, a gas exhaust channel 44 is formed between the insulating layers 82.1 and 82.2, the insulating layers 83.1 and 83.2, the insulating layers 84.1 and 84.2, the first subset of busbars 61 and the second subset of busbars 62 of the first sublayer of busbars 60, the first subset of busbars 71 and the second subset of busbars 72 of the second sublayer of busbars 70, and the top cover 81. This channel extends along the gas exhaust vents 99 of the plurality of aligned battery cells 10 and may be further accessible through openings in the third busbar 77 of the first sublayer 60 of busbars. As the top cover 81 confines the gas exhaust channel 44 from above, it is fully enclosed by the cap assemblies 14, lateral walls of the busbars 65, 75 and insulating layers 82, 83, 84, and the top cover 81. A detailed view of the gas exhaust channel formed by the aforementioned components is shown in FIG. 7. Hence, venting gases emitted through the gas exhaust vents 99 of the battery cells 10 in an abnormal operation condition of the battery cells 10, for example, during thermal runaway, can be exhausted via the gas exhaust channel 44 along the lengthwise direction of the battery module 100 and outcast to the environment from a short side of the battery module 100. The battery module 100 shown in FIGS. 3-5 and 7 also has improved mechanical stability, particularly at a top section thereof due to the positively molded inlays 41, 42.

In the battery module 100 shown in FIGS. 3-5, each of the busbars 65, 75 of the first and second sublayer 60, 70 of busbars has a comb-shape as illustrated in FIG. 2 and includes three body sections 54, 55, 56 forming the busbar body portion 51. Each of the body sections 54, 55, 56 has a spatial extension in the lengthwise direction of the battery module 100 that corresponds to the spatial extension (e.g., to the width) of the battery cases 13 of two battery cells 10 in the lengthwise direction of the battery module 100. Further, a plurality of (e.g., two) cell contact legs 52, 53 extend from the peripheral body sections 54, 55 of each of the busbars 65. Hence, each busbar 65,75 is configured to electrically connect the cell terminals 11, 12 of at least two pairs of battery cells 10, with one pair of battery cells 10 being disposed between the connected pairs of battery cells 10 and being electrically isolated from the busbar 65, 75.

Figure 6:
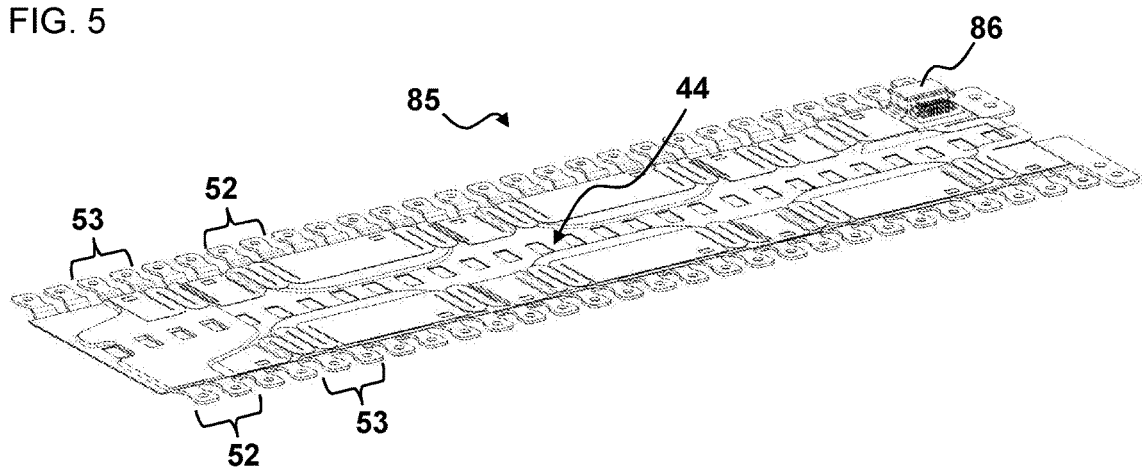
FIG. 6 is a schematic perspective view of a Flexible Printed Circuit according to an embodiment.

According to an embodiment as further illustrated in FIG. 6, the insulating layers 81, 82, 83, 84 and the first and second sublayers 60, 70 of the busbars 65, 67, 75, 77 may form a flexible printed circuit (FPC) 85 when overlaid on each other. Therein, the outer insulating layers 81, 84 may encapsulate the remaining layers 60, 70, 82, 83 by forming an outer insulating shell around the remaining layers 60, 70, 82, 83. Therein, the cell contact legs 52, 53 of the busbars 50 protrude laterally from the FPC 85 to contact the cell terminals 11, 12 of the battery cells 10 of a battery module 100. Further, the inner insulating layers 82, 83 may include metallizations or circuit components of, for example, a Cell Supervision Circuit (CSC). Such circuit components may be configured to detect and/or process cell temperatures and/or voltages and may therefore include surface metallizations configured to electrically connect the busbars 50 (e.g., to electrically connect the busbars 50 to each other). These metallizations may also be connected to an integrated circuit (IC) 86 that may be configured to receive signals corresponding to cell voltages and/or temperatures, to process these signals and/or to communicate with other components as connector. As further shown in FIG. 6, a depression may be formed in an upper surface of the FPC 85 that extends in a lengthwise direction thereof, such that a gas exhaust channel 44 is formed by a combination of (e.g., is formed between) the FPC 85 and the insulating top cover 81, as described above. A plurality of through openings is provided in the depression of the FPC 85 as illustrated in FIG. 6 to allow the exhaust gases of the battery cells 10 to enter the gas exhaust path (or gas exhaust channel) 44. The primary electric components 85 of the FPC 85 may be provided above the second sublayer 70 of busbars 75, 77, below the first sublayer 60 of busbars 65, 67, and/or in between the first sublayer 60 and second sublayer 70 of busbars.

Figure 8:
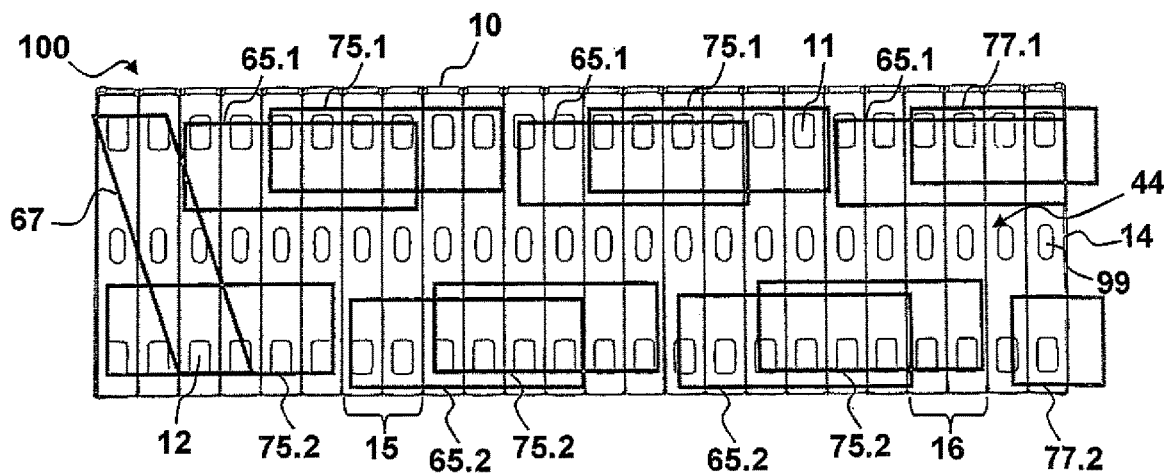
FIG. 8 shows schematic top views of connection schemes of battery modules according to embodiments.
Figure 8:
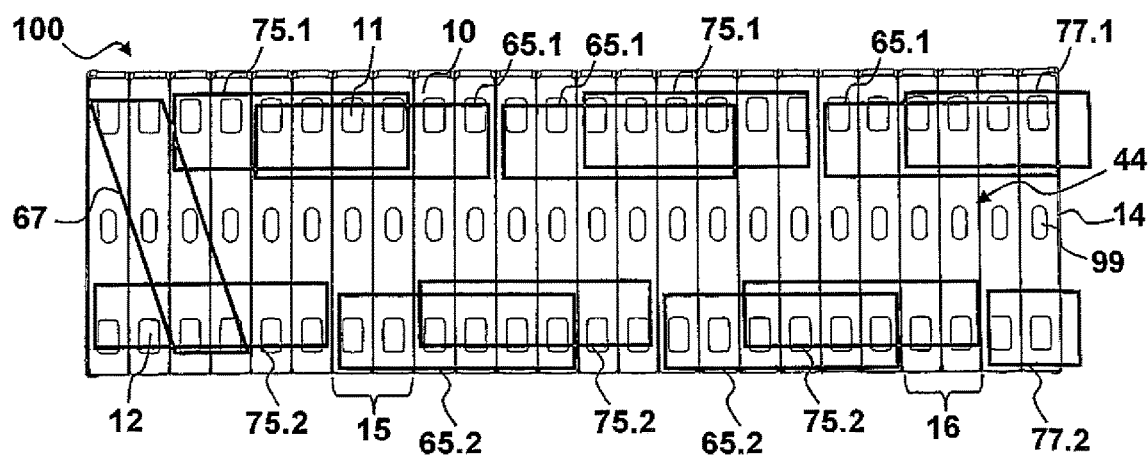
Figure 8:
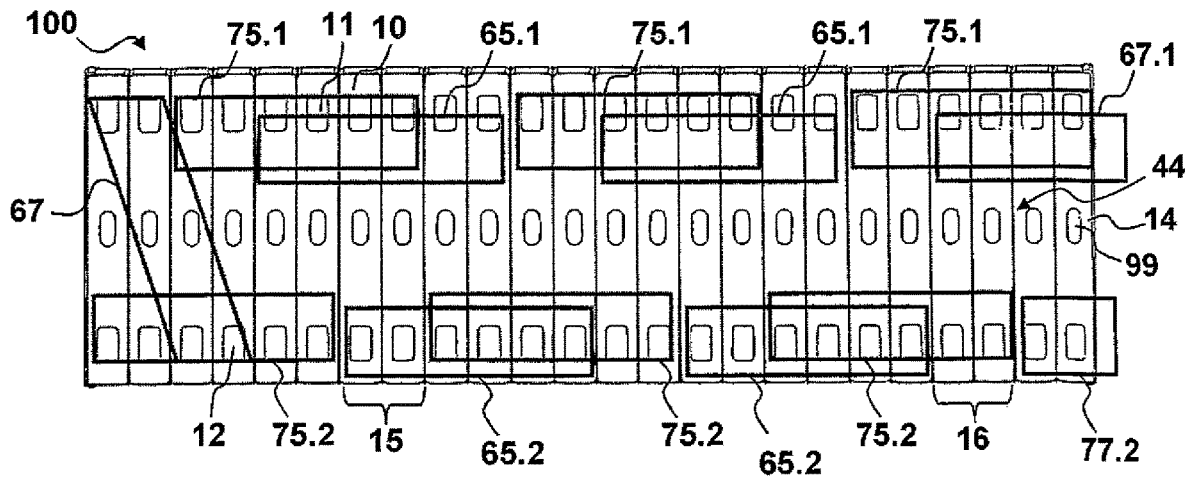

FIG. 8(B) illustrates a current path through the busbars 65, 67, 75, 77 of the battery module 100 shown in to FIGS. 3-7 in more detail, and FIGS. 8(A) and 8(C) illustrate other embodiments of current paths of the battery module 100 in more detail. As can be seen from each of FIGS. 8(A)-8(C), the gas exhaust channel 44 is at least partially confined by lateral side surfaces of the busbars of the first and second sublayers 60, 70 and subsets 61, 71, 62, 72 of busbars, wherein the first subsets 61, 71 of the first and second sublayers 60, 70 of busbars confine an upper boundary of the gas exhaust channel 44, and the second subsets 62, 72 of the first and second sublayers 60, 70 of busbars confine a lower boundary of the gas exhaust channel 44. Hence, by using a double layered busbars arrangement as in the illustrated embodiments, the gas exhaust channel 44 is well confined.

A simple setup of a current path using busbars 65, 67 of a first sublayer 60 of busbars and busbars 75, 77 of a second sublayer 70 of busbars is shown in FIG. 8(A). Therein, a third busbar 77.1 of a first subset 71 of the (upper) second sublayer 70 of busbars connects a first module terminal with the first cell terminals 11 of a second pair of battery cells 10 (counted from the right side of the battery module 100). The second cell terminals 12 of this pair of battery cells 10 are connected via a busbar 75.2 of the second subset 72 of busbars of the second sublayer 70 to the second cell terminals 12 of the next but one pair of battery cells 10 (towards the left). In other words, the busbar 75.2 is not connected to the cell terminals of an adjacent pair of battery cells 10 but is connected to the first cell terminals 11 of the next but one pair (e.g., the next pair after adjacent pair) of battery cells 10. The adjacent pair of battery cells 10 are connected via another busbar 75.1 of the first subset 71 of the second sublayer 70 to a next but one pair of battery cells 10 (to the left), and the second cell terminals 12 of this pair of battery cells 10 is then connected via another busbar 75.2 to a next but one pair of battery cells 10 (to the left). After two more busbars 75.1, 75.2, the second cell terminals 12 of an outermost pair of battery cells 10 on a left side of the battery module 100 are reached.

Hence, in the embodiment shown in FIG. 8(A), the busbars 75.1, 75.2 of the second sublayer 70 connect a second subset 16 of battery cells 10, which is formed by pairs of battery cells 10 starting from the second pair of battery cells 10 counted from a right side of the battery module 100 to the outermost pair of battery cells 10 at a left side of the battery module 100 and being interleaved with pairs of battery cells 10 of a first subset 15 of battery cells 10 as described below. The first cell terminals 11 of this leftmost (outermost) pair of battery cells 10 are connected via a third busbar 67 to the second cell terminals 12 of an adjacent pair of battery cells 10. Therein, the third busbar 67 provides a transition between the first subset 71 of the second sublayer 70 of busbars to the second subset 62 of the first sublayer 60 of busbars. Hence, the third busbar 67 shown in FIG. 8(A) has a bent configuration and extends through any insulating layer 82, 83 disposed between the first and second sublayers 60, 70 of busbars. The first cell terminals 11 of the adjacent pair of battery cells 10 are then connected via a busbar 65.1 of the first subset 61 of the first sublayer 60 of busbars to the first cell terminals 11 of a next but one pair of battery cells 10 and so forth until a busbar 65.1 of the first subset 61 of the first sublayer 60 of busbars provides a connection to the first cell terminals 11 of an outermost pair of battery cells 10 on the right end of the battery module 100. Thus, busbars 65.1 connect a first subset 15 of battery cells 10, which is formed by pairs of battery cells 10 starting from the outermost pair of battery cells 10 counted from a right side of the battery module 100, to a second pair of battery cells 10 counted from the left side of the battery module 100, and the pairs of battery cells 10 of the first subset 15 of battery cells 10 are interleaved with the pairs of battery cells 10 of the second subset 16 of cells 10 as described above. The second cell terminals 12 of the rightmost (outermost) pair of battery cells 10 are then connected to a second module terminal via a third busbar 77.2 of the second sublayer of busbars 70.

Another configuration of the current path through the battery module 100 provided by busbars 65, 67, 75, 77 is illustrated in FIG. 8(B). Therein, a current path again starts with a third busbar 77.1 of a second sublayer 70 of busbars, the third busbar 77.1 connecting a first module terminal with the first cell terminals 11 of a second pair of battery cells 10 (counted from the right side of the battery module 100). Then, the current path proceeds via three further busbars 75.1, 75.2 of the first and second subset 71, 72 of the second sublayer 70 of busbars as described with respect to FIG. 8(A). However, while the second cell terminals 12 of a fifth pair of battery cells 10 counted from the left side of the battery module 100 are connected to a busbar 75.2, the first cell terminals 11 of this pair of battery cells are connected to a busbar 65.1. Hence, a transition between second subset 72 of second sublayer 70 of busbars to lower first subset 61 of first sublayer of busbars 60 is provided.

However, after said busbar 65.1 connects said first cell terminals 11 of said fifth pair of battery cells 10 to the first cell terminals 11 of a third pair of battery cells 10 counted from the left side of the battery module 100, the second cell terminals 12 of said third pair of battery cells 10 are again connected via a busbar 75.2 to the second cell terminals 12 of the outermost left pair of battery cells 10. The first cell terminals 11 of this outermost left pair of battery cells 10 are then connected via third busbar 67 to the second cell terminals 12 of an adjacent pair of battery cells 10. The first cell terminals 11 of said adjacent pair of battery cells 10 is then again connected via a busbar 75.1 to the terminals of a next but one pair of battery cells 10. Hence, solely busbars 75 of the second sublayer 70 of busbars surround third busbar 67 of the first sublayer 60 of busbars and, hence, electric insulation between these busbars 67, 75 is ensured despite any possible overlap between these busbars 67, 75.

Another configuration of the current path through the battery module 100 provided by busbars 65, 67, 75, 77 is illustrated in FIG. 8(C). Therein, and different from the embodiments shown in FIGS. 8(A) and 8(B), a third busbar 67.1 of the first sublayer 60 of busbars connects a first module terminal with the first cell terminals 11 of a second pair of battery cells 10 (counted from the right side of the battery module 100). The second cell terminals 12 of said second pair of battery cells 10 are then connected via a busbar 75.2 of the second subset 72 of the second sublayer 70 of busbars to the second cell terminals 12 of a next but one pair of battery cells 10. The first cell terminals 11 of said next but one pair of battery cells 10 are then again connected via a busbar 65.1 of said first sublayer 60 of busbars and so forth.

In other words, each pair of battery cells 10 is connected to one other pair of battery cells 10 via a busbar 65 and to another pair of battery cells 10 via a busbar 75. A transition between the upper (second) and lower (first) sublayers 60, 70 of busbars is provided via each pair of battery cells 10. This again provides the advantage that solely busbars 75 of the second sublayer 70 of busbars surround third busbar 67 of the lower first sublayer 60 of busbars, which connects the two outermost left pairs of battery cells 10, and hence, electric insulation between these busbars 67, 75 is ensured despite any potential overlap between these busbars 67, 75. However, in the embodiment shown in FIG. 8(C), the second cell terminals 12 of an outermost right pair of battery cells are connected via a third busbar 77.2 of the second sublayer 70 of busbars to a battery module terminals, and hence, the battery module terminals are provided on different sublayers of busbars 60, 70.

SOME REFERENCE NUMERALS 10 battery cells
11 first (e.g., positive) cell terminal 12 second (e.g., negative cell) terminal
13 battery case
14 cap assembly
15 first subset of battery cells
16 second subset of battery cells
40 inlay
41 first subset of inlays
42 second subset of inlays
44 support surface
44 gas exhaust channel
50 busbar
51 busbar body portion
52 cell contact leg
53 cell contact leg
54 first peripheral body section
55 second peripheral body section
56 third central body section
57 first cutout
58 second cutout
60 first (lower) sublayer of busbars
61 first subset of busbars
62 second subset of busbars
63 busbar body portion
64 cell contact leg
65 busbar
66 cell terminal contact portion
67 third busbar
68 bridging portion
70 second (upper) sublayer of busbars
71 first subset of busbars
72 second subset of busbars
75 busbar
77 third busbar
80 insulating layers
81 insulating top cover
82 insulating layer
83 insulating layer
84 insulating layer
85 flexible printed circuit (FPC)
86 integrated circuit (IC)
90 battery module
91 negative module terminal
92 positive module terminal
93 busbar
94 spacer
95 ribbon
96 wide module side surface
97 narrow module side surface
99 gas exhaust vent
100 battery module

What is claimed is:

1. A battery module comprising:
a plurality of battery cells aligned with each other in an alignment direction, each of the battery cells comprising a battery case, an electrode assembly accommodated in the battery case, a cap assembly on the battery case, a gas exhaust vent in the cap assembly, and cell terminals protruding over the cap assembly;
a plurality of busbars on the cap assemblies, each of the busbars electrically connecting the cell terminals of a group of the battery cells to each other, the busbars being configured to conduct current through the battery module;
an electrically insulating inlay molded to at least one of the busbars, the inlay having a height equal to or less than the at least one busbar; and
a top cover on the busbars and covering the cap assemblies of the battery cells, the busbars, and the inlay,
wherein the busbars and the inlay form a support surface facing towards the top cover to support the top cover.

2. The battery module according to claim 1, wherein the busbars and the inlay form a level and/or a straight support surface.

3. The battery module according to claim 1, wherein the height of the inlay corresponds to a height of the at least one busbar.

4. The battery module according to claim 1, further comprising a plurality of inlays, each of the inlays being molded to at least one of the busbars,
wherein the inlays and the busbars form a continuous support surface extending along the plurality of battery cells in the alignment direction of the battery cells.

5. The battery module according to claim 4, wherein the continuous support surface also extends along the plurality of battery cells in a direction perpendicular to the alignment direction of the plurality of battery cells.

6. The battery module according to claim 1, wherein, for each of the battery cells, the gas exhaust vent is between a first one of the cell terminals and a second one of the cell terminals,
wherein the busbars are arranged in a first subset of busbars and a second subset of busbars,
wherein the first subset of busbars electrically interconnect the first cell terminals, and the second subset of busbars electrically interconnect the second cell terminals, and
wherein a first subset of inlays is molded to the busbars of the first subset of busbars, and a second subset of inlays is molded to the busbars of the second subset of busbars.

7. The battery module according to claim 6, wherein a gas exhaust channel is formed by the busbars and extends over the gas exhaust vents of the battery cells.

8. The battery module according to claim 7, wherein the gas exhaust channel is confined by the first subset of inlays, the second subset of inlays, the cap assemblies, and the top cover.

9. The battery module according to claim 1, wherein each of the busbars comprises:
a busbar body portion extending in the alignment direction of the battery module; and
a plurality of legs extending from the busbar body portion in a direction non-parallel to the alignment direction of the battery module, the legs being configured to electrically connect the busbar body portion and the cell terminals to each other.

10. The battery module according to claim 9, wherein the busbar body portion has a first body section with at least one of the legs extending therefrom, a second body section with at least one of the legs extending therefrom, and a third body section between the first and second body sections, and
wherein the body sections have the same length in the alignment direction.

11. The battery module according to claim 10, wherein the busbars are arranged into a first sublayer of busbars and a second sublayer of busbars, and
wherein the busbars in the first sublayer of busbars are shifted with respect to the busbars in the second sublayer of busbars by a length of one of the body sections.

12. The battery module according to claim 10, wherein the body sections have a length extending in the alignment direction that corresponds to a length of two parallely-connected battery cells of the battery module.

13. A battery module comprising:
a plurality of battery cells aligned with each other in an alignment direction, each of the battery cells comprising a battery case, an electrode assembly accommodated in the battery case, a cap assembly on the battery case, a gas exhaust vent in the cap assembly, and cell terminals protruding over the cap assembly;
a plurality of busbars on the cap assemblies, each of the busbars electrically connecting the cell terminals of a group of the battery cells to each other, the busbars being configured to conduct current through the battery module;
an inlay molded to at least one of the busbars, the inlay having a height equal to or less than the at least one busbar; and
a top cover on the busbars and covering the cap assemblies of the battery cells, the busbars, and the inlay,
wherein the busbars and the inlay form a support surface facing towards the top cover to support the top cover,
wherein the busbars are arranged into a first sublayer of busbars and a second sublayer of busbars,
wherein the first sublayer of busbars interconnects a first subset of the battery cells,
wherein the second sublayer of busbars interconnects a second subset of the battery cells,
wherein the second sublayer of busbars is over the first sublayer of busbars, and
wherein the busbars in the first sublayer of busbars are shifted with respect to the busbars in the second sublayer of busbars.

14. The battery module according to claim 13, wherein the first sublayer of busbars is separated from the second sublayer of busbars via an electrically insulating layer.

15. The battery module according to claim 14, wherein at least one of the busbars in the first sublayer of busbars has a planar busbar body portion with a height equal to or less than that of the cell terminals of a corresponding one of the battery cells and a leg, the leg having a cell terminal contact portion spaced from the busbar body portion in a height direction thereof and having a bridging portion connecting the busbar body portion and the cell terminal contact portion to each other, and
wherein at least one of the busbars of the second sublayer of busbars has planar shape with a height equal to or less than that of the cell terminals of a corresponding one of the battery cells.

* * * * *